United States Patent [19]
Lehmann et al.

[11] Patent Number: 5,242,231
[45] Date of Patent: Sep. 7, 1993

[54] METHOD FOR ACTIVATING AND FOR DRIVING PRINTING ELEMENTS

[75] Inventors: Manfred Lehmann, Puchheim; Stefan Scherdel, München, both of Fed. Rep. of Germany

[73] Assignee: Mannesmann Aktiengesellschaft, Düsseldorf, Fed. Rep. of Germany

[21] Appl. No.: 843,606

[22] Filed: Feb. 4, 1992

Related U.S. Application Data

[63] Continuation-in-part of PCT/DE90/00105, filed Feb. 16, 1990.

[30] Foreign Application Priority Data

Aug. 4, 1989 [DE] Fed. Rep. of Germany .... 3925912.9

[51] Int. Cl.⁵ .............................................. B41J 2/485
[52] U.S. Cl. .................................... 400/124; 400/121
[58] Field of Search ........................... 400/124, 121; 101/93.05

[56] References Cited

U.S. PATENT DOCUMENTS 4,799,068  1/1989  Saito et al. ........................ 400/126

FOREIGN PATENT DOCUMENTS

| | | |
|---|---|---|
| 0013296 | 7/1980 | European Pat. Off. |
| 0160318 | 6/1985 | European Pat. Off. |
| 0213507 | 8/1986 | European Pat. Off. |
| 0206666 | 3/1984 | Japan |
| 0022960 | 7/1984 | Japan |
| 0057532 | 3/1986 | Japan |
| 62-212164 | 9/1987 | Japan |
| 0225349 | 10/1987 | Japan |

OTHER PUBLICATIONS

IBM: Technical Dsiclosure Bulletin, vol. 27, No. 9, Feb. 1985, "Improvement of Digital Typeface Printing", Colby.

IBM Technical Disclosure Bulletin, vol. 27, No:4B, Sep. 1984, p. 2504.

Primary Examiner—Edgar S. Burr
Assistant Examiner—John S. Hilten
Attorney, Agent, or Firm—Horst M. Kasper

[57] ABSTRACT

The invention relates to a process for driving printing elements of a dot matrix printer in which the matrix dots to be printed are to be thinned out without any thin lines, in particular steeply inclined thin lines, being lost. To this end, before thinning out each matrix dot to be printed is associated with another matrix dot disposed on a nearest neighbor grid point in a certain direction of addition. After thinning out, the respective characters or images are printed sufficiently well and clearly. The process is intended for use in dot matrix printers.

23 Claims, 2 Drawing Sheets

METHOD FOR ACTIVATING AND FOR DRIVING PRINTING ELEMENTS

CROSS-REFERENCE TO RELATED APPLICATIONS

This application is a continuation-in-part application of another international application filed under the Patent Cooperation Treaty Feb. 16, 1990, bearing Application No. PCT/DE90/00105, and listing the United States as a designated and/or elected country. The entire disclosure of this latter application, including the drawings thereof, is hereby incorporated in this application as if fully set forth herein.

BACKGROUND OF THE INVENTION

1. Field of the Invention

The present invention relates to a method for activating and driving printing elements, which printing elements are formed as ink print devices, ejecting ink droplets. The ink print devices are disposed in several rows with in each case a plurality of printing elements. The ink print devices generate dots for the representation of a character at certain grid points within a grid formed in a matrix shape. The generation of the dots within the matrix is performed column by column parallel to each other. A thinning out of the required grid points is performed for the representation of certain characters and character groups, wherein each second printable grid point is suppressed in each column of the grid, and wherein the suppressed matrix dots in the respectively neighboring column are shifted relative to each other by a matrix dot.

2. Brief Description of the Background of the Invention Including Prior Art

Print devices recited above are furnished, for example, in ink print devices (DE-OS 1,941,680), wherein many printing elements print characters at high printing speed onto a recording substrate. These printing elements are formed, for example, as ink printing elements and are disposed in columns and rows such that they form a matrix. If a character is to be printed, then the printing elements, required for the formation of this character, are driven and activated such that the corresponding matrix dots are inked in the matrix, forming the base for the character formation.

In case of certain character representations (for example, near-letter quality or in case of larger character areas for the reduction of the ink volume), a so-called matrix thinning out is desired For example, each second printable dot within the matrix is suppressed checkerboard-like in each column. The suppressed dot is shifted by one line in each subsequent column It can occur in this context that thin lines appear frayed or are also lost depending on the inclination angle.

The first point, present for the formation of the character, was always printed in the near-letter-quality method in each column of the matrix and the matrix thinning out was only subsequently performed according to the checkerboard system in order not to lose any information. However, an interfering structuring of face-like representations can occur in this connection when the starting line is at an inclined or a curved angle.

A method for the adjustment of a serial recording device was submitted as a patent application by the assignee of the instant application on May 14, 1991 and received Ser. No. 07/699,932. A method for printing magnetically recognizable characters using a matrix print head as well as a method for producing the same was submitted as a patent application by the assignee of the instant application on Oct. 21, 1991 and received Ser. No. 07/779,954.

SUMMARY OF THE INVENTION

1. Purposes of the Invention

The purpose of the invention method is now to comprise avoiding the recited disadvantage and avoiding a loss of information.

These and other objects and advantages of the present invention will become evident from the description which follows.

2. Brief Description of the Invention

According to the present invention, there is provided for a method for the activation and driving of printing elements comprising the following steps. A plurality of ink elements is disposed in several rows for providing ink print devices. Dots are generated for the representation of a character with the ink print devices at certain grid points in a rectangular grid. The generation of the dots within a matrix is performed in columns, disposed parallel relative to each other. A direction of addition directed toward one of four nearest neighbor grid points is defined for all grid points having such nearest neighbor grid point. An additional matrix dot is placed on the nearest neighbor grid point located in the direction of addition for each matrix dot initially used to form the character, where this matrix dot is not at an end side of the grid relative to the direction of addition in case such nearest neighbor grid point is not yet occupied, such that the original matrix dot and the next nearest matrix dot in the defined direction are occupied. The required grid points are thinned out during a representation of certain characters and character groups, wherein each second printable grid point is suppressed in each column of the grid, and wherein the suppressed grid points are shifted by one grid point relative to each other in the in each case neighboring column.

The ink elements can be formed as impact devices acting on an ink ribbon or as nozzles ejecting ink droplets.

The dots can be formed on a light sensitive substrate by irradiation followed by contact with a toner material.

Each one of the several rows can contain one print element.

The defined direction can be toward an immediately preceding grid point, toward an immediately following grid point, toward a grid point disposed immediately above the original matrix dot and toward a grid point disposed immediately above the original matrix dot for all matrix dots not disposed on an upper edge of the grid, toward a grid point disposed immediately below the original matrix dot, or toward a grid point disposed immediately below the original matrix dot for all matrix dots not disposed on a lower edge of the grid.

In a method for the activation and driving of printing elements, a number of rows is defined for providing printing action. An ink element is disposed for each row for providing a respective ink print device. Dots are generated for the representation of a character with the ink print devices at certain grid points in a grid. The generation of the dots within a matrix is performed in columns, with each column containing a point of each row. A direction of addition directed toward one of four nearest neighbor grid points is defined for all grid points having such nearest neighbor grid point. An additional matrix dot is placed on the nearest neighbor grid point located in the defined direction of addition for each matrix dot initially used to form the character. The grid points are thinned out during a representation of certain characters and character groups such that each alternate grid point of each row and each alternate grid point of each column are suppressed.

To this end, according to a first embodiment, there is generated a matrix dot in the immediately preceding column in the same line in addition to each matrix dot, initially provided for the formation of the character, before this thinning out of the required matrix dots, and a thinning out is only performed subsequently.

To this end, according to a second embodiment, there is generated a matrix dot in the next successive column in the same line in addition to each matrix dot, initially provided for the formation of the character, before this thinning out of the required matrix dots, and a thinning out is only performed subsequently.

To this end, according to a third embodiment, there is generated a matrix dot in the next upper row in the same column in addition to each matrix dot, initially provided for the formation of the character, before this thinning out of the required matrix dots, and a thinning out is only performed subsequently.

To this end, according to a fourth embodiment, there is generated a matrix dot in the next lower row in the same column in addition to each matrix dot, initially provided for the formation of the character, before this thinning out of the required matrix dots, and a thinning out is only performed subsequently.

This is associated with the advantage that, based on the checkerboard-like performed thinning out method of the matrix dots to be printed, there does not occur a loss of essential character parts and that, in particular, also character parts, furnished with an inclination angle of 45 degrees, are recorded.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

According to the present invention, there is provided for a method for the activation and driving of printing elements, which are formed as ink print devices, ejecting ink droplets. The ink print devices are disposed in several rows with in each case a plurality of ink elements. The ink print devices generate dots at certain grid points within a grid, formed in matrix shape, for the representation of a character. The generation of the dots within the matrix is performed in columns, disposed parallel relative to each other. A thinning out of the required grid points is performed during the representation of certain characters and character groups, in that each second printable grid point is suppressed in each column of the grid, and wherein the suppressed grid points are shifted by one grid point relative to each other in the in each case neighboring column. Before this thinning out of the required matrix dots, there is generated a matrix dot in the previous column in the same line in addition to each matrix dot initially provided for the formation of the character, and a thinning out is only performed subsequently.

Figure 1:
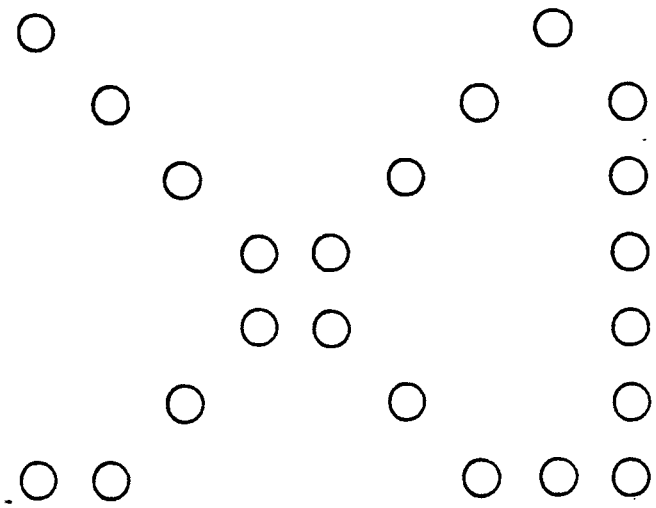
FIG. 1 is a view of a schematic diagram of the character in a non-thinned out form.
Figure 2:
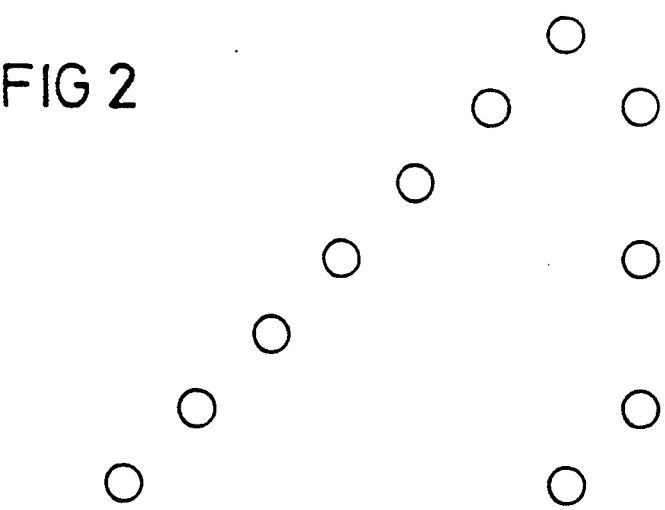
FIG. 2 is a view of a schematic diagram of the character of FIG. 1 in a conventional thinned out form.

FIG. 1 illustrates a character, formable of the individual matrix dots disposed on a rectangular grid, in a non-thinned-out shape, with the columns a1, b1 through a5, b5 and the lines 1 through 7, wherein the round circles represent the matrix dots. FIG. 2 illustrates the same character as in FIG. 1, however thinned out according to the checkerboard-like method with the residual matrix dots shown as circles.

As can be recognized from FIGS. 1 and 2, in particular in certain inclined positions of character parts. So many essential grid points are eliminated under certain circumstances during the formation of a character during a thinning out of the grid according to the conventional method that the character as such can no longer be unequivocally recognized.

For example, in column b1, no matrix dot is inked in line 1, 3, 5, and 7. In the columns a2, b3, a3, b3, a4, b4, only one matrix dot is inked in each case such that a drawn line, running from the left top toward the right bottom, disappears completely (FIG. 2).

FIG. 3 illustrates again the same character, however, with the additional grid point occupation corresponding to the invention method, in a corresponding control drive unit prior to the thinning out. The additional matrix dots are in this case illustrated in a square form.

Figure 3:
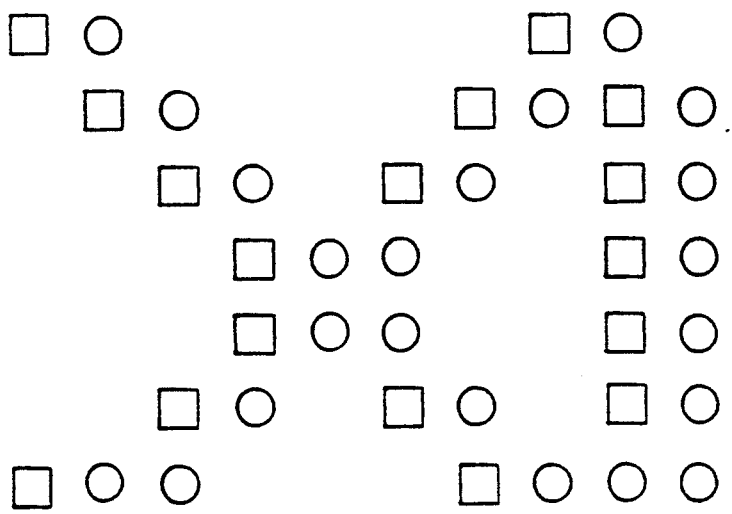
FIG. 3 is a view of a schematic diagram of the first embodiment showing for each original dot an immediately preceding dot.

According to FIG. 3, an additional matrix dot is coordinated according to the invention to each matrix dot in the immediately preceding column and the same line row for the representation of the non-thinned out character according to FIG. 1 (in the non-represented drive unit). If a thinning out is now performed according to the checkerboard-like method, then there results the character formation according to FIG. 4.

Figure 4:
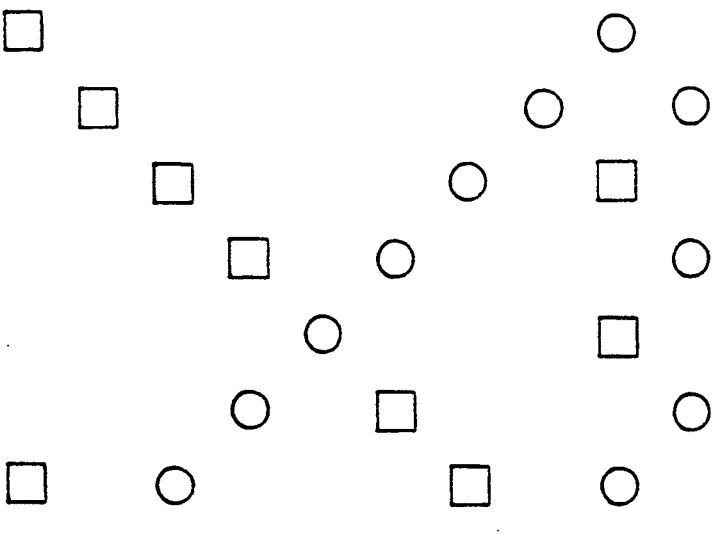
FIG. 4 is a view of a schematic diagram of the first embodiment showing the grid positions of the dots according to FIG. 3 after thinning out.

FIG. 4 illustrates the same character as in FIG. 3 after a thinning out corresponding to the known checkerboard-like method. The initial grid points are shown therein as circles and the points, generated by the additional grid points, are recorded with a square shape. In case of the determination of the matrix dots in the columns a1 to b5 subsequent to the line selection 1, 3, 5, 7, and thereupon 2, 4, 6, there results a sufficient number of well distributed matrix dots to be printed in order to recognize the character. Therefore, even thin lines can no longer be lost in case of a for example 45-degree slope and a possibly occurring dot loss is no longer recognizable as disturbing in case of high resolution.

According to a second embodiment, an additional matrix dot is coordinated to each matrix dot in the next following column and in the same line row for a representation of the non-thinned out character according to FIG. 1.

According to a third embodiment, an additional matrix dot is coordinated to each matrix dot in the next upper row in the same column for a representation of the non-thinned out character according to FIG. 1. The additional matrix dots for the uppermost row can be either dispensed with or an additional print element can be provided for dots eventually remaining in the uppermost row.

According to a fourth embodiment, an additional matrix dot is coordinated to each matrix dot in the next lower row in the same column for a representation of the non-thinned out character according to FIG. 1. The additional matrix dots for the lowermost row can be either dispensed with or an additional print element can be provided for dots eventually remaining in the lowermost row.

It will be understood that each of the elements described above, or two or more together, may also find a useful application in other types of methods for driving printing elements differing from the types described above.

While the invention has been illustrated and described as embodied in the context of a method for activating and for driving printing elements, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method for the activation and driving of printing elements comprising disposing a plurality of ink elements in several rows
   generating matrix dots to represent a character with the ink elements, the matrix dots forming the characters being a plurality of grid points within a substantially rectangular matrix wherein the generation of the dots within the matrix being in columns, disposed parallel relative to each other substantially perpendicular to said rows;
   defining a direction of addition directed from one of said dots towards one of four nearest surrounding grid points for all grid points having such nearest surrounding grid point;
   generating an additional matrix dot on the nearest neighbor grid point located in the direction of addition for each matrix dot initially generated to form the character, where additional matrix dot is not additionally generated if the nearest neighbor grid point is occupied, such that an original matrix dot and the next nearest matrix dot in the defined direction are occupied;
   thinning out grid points by suppressing every other of certain characters and character groups, by suppressing everyother grid point in each column of the grid, and wherein rows, where the suppressed grid points are located, are shifted by one grid point relative to each other in each neighboring column.

2. The method for the activation and driving of printing elements according to claim 1, wherein the defined direction is toward an immediately preceding grid point.

3. The method for the activation and driving of printing elements according to claim 1, wherein the defined direction is toward an immediately following grid point.

4. The method for the activation and driving of printing elements according to claim 1, wherein the defined direction is toward a grid point disposed immediately above the original matrix dot.

5. The method for the activation and driving of printing elements according to claim 1, wherein the defined direction is toward a grid point disposed immediately above the original matrix dot for all matrix dots not disposed on an upper edge of the grid.

6. The method for the activation and driving of printing elements according to claim 1, wherein the defined direction is toward a grid point disposed immediately below the original matrix dot.

7. The method for the activation and driving of printing elements according to claim 1, wherein the defined direction is toward a grid point disposed immediately below the original matrix dot for all matrix dots not disposed on a lower edge of the grid.

8. The method for the activation and driving of printing elements according to claim 1, wherein the ink elements are formed as impact devices acting on an ink ribbon.

9. The method for the activation and driving of printing elements according to claim 1, wherein the ink elements are formed as nozzles ejecting ink droplets.

10. The method for the activation and driving of printing elements according to claim 1, wherein the dots are formed on a light sensitive substrate by irradiation followed by contact with a toner material.

11. The method for the activation and driving of printing elements according to claim 1, wherein each one of the several rows contains one print element.

12. A method for the activation and driving of printing elements comprising defining a number of rows for providing printing action; disposing an ink element for each row generating matrix dots to represent a character with the ink elements, the matrix dots forming the characters being a plurality of grid points with a matrix grid wherein the generation of the dots within the matrix being in columns, with each column containing a point within each row; defining a direction of addition directed from one of said dots toward one of four nearest neighbor grid points for all grid points having such nearest neighbor grid point; generating an additional matrix dot on the nearest neighbor grid point located in the defined direction of addition for each matrix dot initially generated to form the character; thinning out grid points of certain characters and character groups in each column of the grid, and wherein rows, where the suppressed grid points are located, are shifted by one grid point relative to each other in each neighboring column.

13. The method for the activation and driving of printing elements according to claim 12, wherein the defined direction is toward an immediately preceding grid point.

14. The method for the activation and driving of printing elements according to claim 12, wherein the defined direction is toward an immediately following grid point.

15. The method for the activation and driving of printing elements according to claim 12, wherein the defined direction is toward a grid point disposed immediately above the original matrix dot.

16. The method for the activation and driving of printing elements according to claim 12, wherein the defined direction is toward a grid point disposed immediately above the original matrix dot for all matrix dots not disposed on an upper edge of the grid 17. The method for the activation and driving of printing elements according to claim 12, wherein the defined direction is toward a grid point disposed immediately below the original matrix dot.

18. The method for the activation and driving of printing elements according to claim 12, wherein the defined direction is toward a grid point disposed immediately below the original matrix dot for all matrix dots not disposed on a lower edge of the grid.

19. The method for the activation and driving of printing elements according to claim 12, wherein the ink elements are formed as impact devices acting on an ink ribbon.

20. The method for the activation and driving of printing elements according to claim 12, wherein the ink elements are formed as nozzles ejecting ink droplets.

21. The method for the activation and driving of printing elements according to claim 12, wherein the dots are formed on a light sensitive substrate by irradiation followed by contact with a toner material.

22. The method for the activation and driving of printing elements according to claim 12, wherein each one of the several rows contains one print element.

23. A method for the activation and driving of printing elements, comprising forming said printing elements as ink print devices, disposing said ink print devices in several rows as a plurality of ink elements, said ink print devices generating dots at certain grid points within a grid, to form a matrix to represent a character, wherein the generation of the dots within the matrix being in columns disposed parallel relative to each other generating a matrix dot in the previous column in the same row in addition each matrix dot generated in the formation of the character; thinning out grid points of certain characters and character groups, by suppressing each second printable grid point in each column of the grid, wherein the rows, where the suppressed grid points are located, are shifted by one grid point relative to each other in each case neighboring.

* * * * *